United States Patent
Dayal et al.

(10) Patent No.: US 7,483,370 B1
(45) Date of Patent: Jan. 27, 2009

(54) METHODS AND SYSTEMS FOR HITLESS SWITCH MANAGEMENT MODULE FAILOVER AND UPGRADE

(75) Inventors: Rana Dayal, Cary, NC (US); Donald B. Grosser, Apex, NC (US); Michael D. Mroz, Fuquay Varina, NC (US); Daniel L. Schweitzer, Durham, NC (US)

(73) Assignee: Extreme Networks, Inc., Santa Clara, CA (US)

( * ) Notice: Subject to any disclaimer, the term of this patent is extended or adjusted under 35 U.S.C. 154(b) by 870 days.

(21) Appl. No.: 10/743,887

(22) Filed: Dec. 22, 2003

(51) Int. Cl.
*G06F 11/07* (2006.01)
(52) U.S. Cl. .................................. 370/219; 370/252
(58) Field of Classification Search .................. 370/216, 370/217, 218, 219
See application file for complete search history.

(56) References Cited

U.S. PATENT DOCUMENTS

| | | | |
|---|---|---|---|
| 4,694,452 A * | 9/1987 | Beckinger et al. ........... 370/360 |
| 5,835,696 A | 11/1998 | Hess | |
| 5,963,540 A | 10/1999 | Bhaskaran | |
| 6,035,415 A | 3/2000 | Fleming | |
| 6,148,410 A | 11/2000 | Baskey et al. | |
| 6,442,250 B1 * | 8/2002 | Troen-Krasnow et al. ........... 379/93.15 |
| 6,490,246 B2 | 12/2002 | Fukushima et al. | |
| 6,650,660 B1 * | 11/2003 | Koehler et al. ............ 370/503 |
| 6,674,713 B1 * | 1/2004 | Berg et al. ................. 370/217 |
| 6,732,184 B1 | 5/2004 | Merchant et al. | |
| 6,738,826 B1 * | 5/2004 | Moberg et al. ............ 709/242 |
| 6,751,191 B1 | 6/2004 | Kanekar et al. | |
| 6,885,635 B1 | 4/2005 | Haq et al. | |
| 6,928,576 B2 | 8/2005 | Sekiguchi | |
| 6,941,487 B1 | 9/2005 | Balakrishnan et al. | |
| 7,274,711 B2 * | 9/2007 | Kajizaki et al. ............. 370/473 |
| 7,274,926 B1 * | 9/2007 | Laumen et al. .......... 455/414.1 |
| 2003/0154154 A1 * | 8/2003 | Sayal et al. .................... 705/37 |
| 2004/0001485 A1 * | 1/2004 | Frick et al. ................. 370/389 |
| 2004/0034703 A1 * | 2/2004 | Phadke ....................... 709/224 |
| 2004/0047286 A1 * | 3/2004 | Larsen et al. ............... 370/216 |

FOREIGN PATENT DOCUMENTS

| | | |
|---|---|---|
| EP | 1 294 137 A1 | 3/2003 |
| GB | 2 409 601 A | 6/2005 |
| WO | WO 02/098059 | 12/2002 |

OTHER PUBLICATIONS

Office Action for U.S. Appl. No. 10/184,483 (Jun. 12, 2007).
Office Action for U.S. Appl. No. 10/184,483 (Sep. 20, 2006).
Kim et al., "Scalable Redundant IPC Network," IEEE, pp. 176-179 (Nov. 2004).

* cited by examiner

*Primary Examiner*—Ben H Liu
(74) *Attorney, Agent, or Firm*—Jenkins, Wilson, Taylor & Hunt, P.A.

(57) ABSTRACT

Methods and systems for hitless switch management module failover and upgrade are disclosed. According to one method, a master switch management module participates in network protocols and performs packet forwarding operations. The master switch management module distributes protocol state and packet forwarding information to the slave switch management module. The slave switch management module continuously monitors the operational state of the master switch management module. In response to detecting failure of the master switch management module or a forced failover initiated by the user interface on the master switch management module, the slave switch management module begins network protocol operation in the master mode in a state where the master switch management module last operated correctly.

44 Claims, 8 Drawing Sheets

METHODS AND SYSTEMS FOR HITLESS SWITCH MANAGEMENT MODULE FAILOVER AND UPGRADE

TECHNICAL FIELD

The present invention relates to methods and systems for hitless failover between primary and backup management components in a switched network element. More particularly, the present invention relates to methods and systems for hitless restart of packet forwarding in response to failover from primary to backup management components in a switched network element.

BACKGROUND ART

Switched network elements, such as layer 2 and layer 3 switches, typically include management modules for participating in layer 2 and layer 3 protocols, learning layer 2 and layer 3 addresses, and distributing copies of forwarding tables to input/output modules associated with ports. In order to provide increased reliability, some switched network elements include primary and backup management modules. During normal operation, the primary management module performs switch management and packet forwarding functions. The backup management module monitors the operation of the primary management module and takes over when the primary management module fails.

Conventional failover methods between primary and backup switch management modules are not hitless. That is, the methods used to perform such failovers are such that received packets will be discarded or routed around the failed device while the failover occurs. For example, in one type of failover, when the primary switch management module fails, the backup switch management module initializes. That is, it loads configuration information, begins participating in routing and forwarding protocols from an initial state, and once it builds its routing and forwarding tables, begins forwarding packets. The time required to load configuration information, participate in the routing and forwarding protocols from an initial state, and program hardware to begin forwarding packets is such that other devices in the network may mark the failed device as unavailable and route packets around the device, depending on protocol timeout values. In addition, packets that were already received by the device will be dropped.

In light of the problems associated with failovers between switch management modules, it is desirable to perform a failover in which complete initialization of the new primary switch management module is not required. For example, it is desirable for the backup switch management module to take over the duties of the failed primary switch management module without resetting the packet forwarding hardware. Thus, some packets may be forwarded by the new primary switch management module without being dropped. However, such a failover may not be hitless because network protocols must be restarted from the initial state in the new primary switch management module. Participation in such protocols to develop the proper protocol states and data structures requires time, during which packets may be dropped. Thus, even a failover in which packet forwarding hardware is not reset may not be completely hitless.

Another problem associated with switch management modules is software upgrades. Software upgrades have not been hitless because of the inability to communicate protocol state and data structure information between different software versions. For example, if the backup switch management module is initialized with a new software version and the primary switch management module is executing a prior software version, the data structures between the software versions may not be compatible. As a result, the new software version may not be capable of using data generated by the switch management module executing the prior software version. Therefore, the backup switch management module executing the new software version must initialize its hardware and begin participating in forwarding protocols in order to build its forwarding databases. As discussed above, due to the amount of time required to participate in network protocols and build the appropriate data structures, software upgrades that require switch management module initialization may not be hitless.

Accordingly, in light of the problems associated with switch management module failover and upgrade, there exists a need for improved methods and systems for hitless switch management module failover and upgrade.

DISCLOSURE OF THE INVENTION

The present invention includes methods and systems for hitless switch management module failover and upgrade. According to one implementation, a switch may include first and second switch management modules. The first switch management module operates in a master mode. Operating in a master mode may include maintaining layer 2 and layer 3 packet forwarding tables, participating in layer 2 and layer 3 network protocols and storing protocol state information, programming switching hardware using the forwarding tables, and performing packet forwarding for packets that cannot be forwarded by the switching hardware. In addition, operating in the master mode may include communicating configuration information, forwarding data structures, and protocol state information to the second switch management module, which may be operating in slave mode. The information may be communicated to the second switch management module at periodic intervals or when information changes. The second switch management module operates in slave mode. Operating in slave mode may include continuously monitoring the operational state of the first switch management module. In addition, the second switch management module may receive the configuration, protocol state, and forwarding data structure information from the first switch management module. In response to detecting failure of the first switch management module, the second switch management module may change to the master mode and begin participation in the network protocols in the same state where the first switch management module last operated correctly. Starting the network protocols in the state where the first switch management module last operated correctly enables restart to be performed in a hitless manner.

According to another aspect, the present invention includes a method for hitless software upgrade in a switched network element. In one implementation, a first switch management module is operated in a master mode and a second switch management module is operated in a slave mode. In the master mode, the first switch management module forwards packets and participates in network protocols using a first software version. In the slave mode, the second switch management module continuously monitors the state of the first switch management module. The second switch management module also stores a second software version in memory.

In order to initialize a hitless software upgrade, the second switch management module is forced to perform a soft reboot and start up in the slave mode using the second software version. The term "soft reboot," as used herein, refers to restarting software executed by a switch management module without resetting the corresponding packet forwarding hardware. The first switch management module then downloads protocol state information, forwarding data structures, and configuration information to the second switch management module. A user may then trigger a failover via a user interface command. In response to the failover command, the second switch management module begins operating network protocols at the point where the first switch management module last operated correctly, using the received protocol state information. Using these steps, a hitless software upgrade can be achieved. That is, a switched network element can be switched from a first software version to a second software version without dropping packets.

The hitless methods and systems described herein can be used to upgrade or downgrade software. For example, the methods described herein may be used to replace an old software version with a newer version. In addition, if it is desirable to change from an older version to a newer version (e.g., because the older version is determined to perform better or more reliably), the methodology described herein may be used.

According to yet another aspect of the invention, communications between master and slave switch management modules may be performed using a canonical message system. For example, both the master and slave switch management modules may store data that is used to recognize certain message types and lengths. When communicating protocol state information, forwarding data structure information, or configuration information from the master switch management module to the slave switch management module, a message format that corresponds to the message type and length rules stored by the master and slave switch management modules is used. As a result, if a data structure used by the slave switch management module includes a new data field that is not present in the corresponding data structure of the master switch management module, the data structure in the slave switch management module can still be updated to include all of the former fields included in the corresponding data structure in the master switch management module, even though the data structures are different.

According to yet another aspect, the present invention includes a method for bracketing information sent between master and slave switch management modules into atomic transactions. In one implementation, the master switch message module may set an open bracket bit in the first of a series of related information being communicated to the slave switch management module. In response to the open bracket bit, the slave switch management module may enter an open_bracket_received state in which the slave switch management module stores all messages received after the open bracket as part of a single transaction. If the master switch management module fails before a message containing a close bracket bit is received, the slave management module may discard messages received after the open bracket bit and may perform a non-hitless failover in which hardware is re-initialized. If the close bracket bit is received before the timer expires, the slave considers the messages received since the open bracket bit as part of an atomic transaction and updates the corresponding packet forwarding and protocol state information.

Using bracketing ensures synchronization between protocol state and packet forwarding information. For example, forwarding data structure information as well as the current protocol state that corresponds to the forwarding data structure information may be part of a single transaction broken into multiple messages sent from the master switch management module to the slave switch management module. If the master switch management module fails after transmitting the packet forwarding information but before transmitting the corresponding protocol state information, without bracketing, the slave protocol state information would be out of sync with the corresponding packet forwarding information. Using bracketing prevents problems from occurring by ensuring that the slave discards incomplete transactions received from the master and reinitializes itself with data known to be accurate.

The methods and systems for hitless switch management module failover and upgrade will be described herein as being performed by functions, modules, or processes. It is understood that these functions, modules, or processes may be implemented in hardware, software, firmware, or any combination thereof.

Accordingly, it is an object of the invention to provide methods and systems for hitless switch management module failover.

It is another object of the invention to provide methods and systems for hitless switch management module software upgrades.

Some of the objects of the invention having been stated hereinabove, other objects will become evident as the description proceeds when taken in connection with the accompanying drawings as best described hereinbelow.

BRIEF DESCRIPTION OF THE DRAWINGS

Preferred embodiments of the invention will now be explained with reference to the accompanying drawings of which.

DETAILED DESCRIPTION OF THE INVENTION

Figure 1:
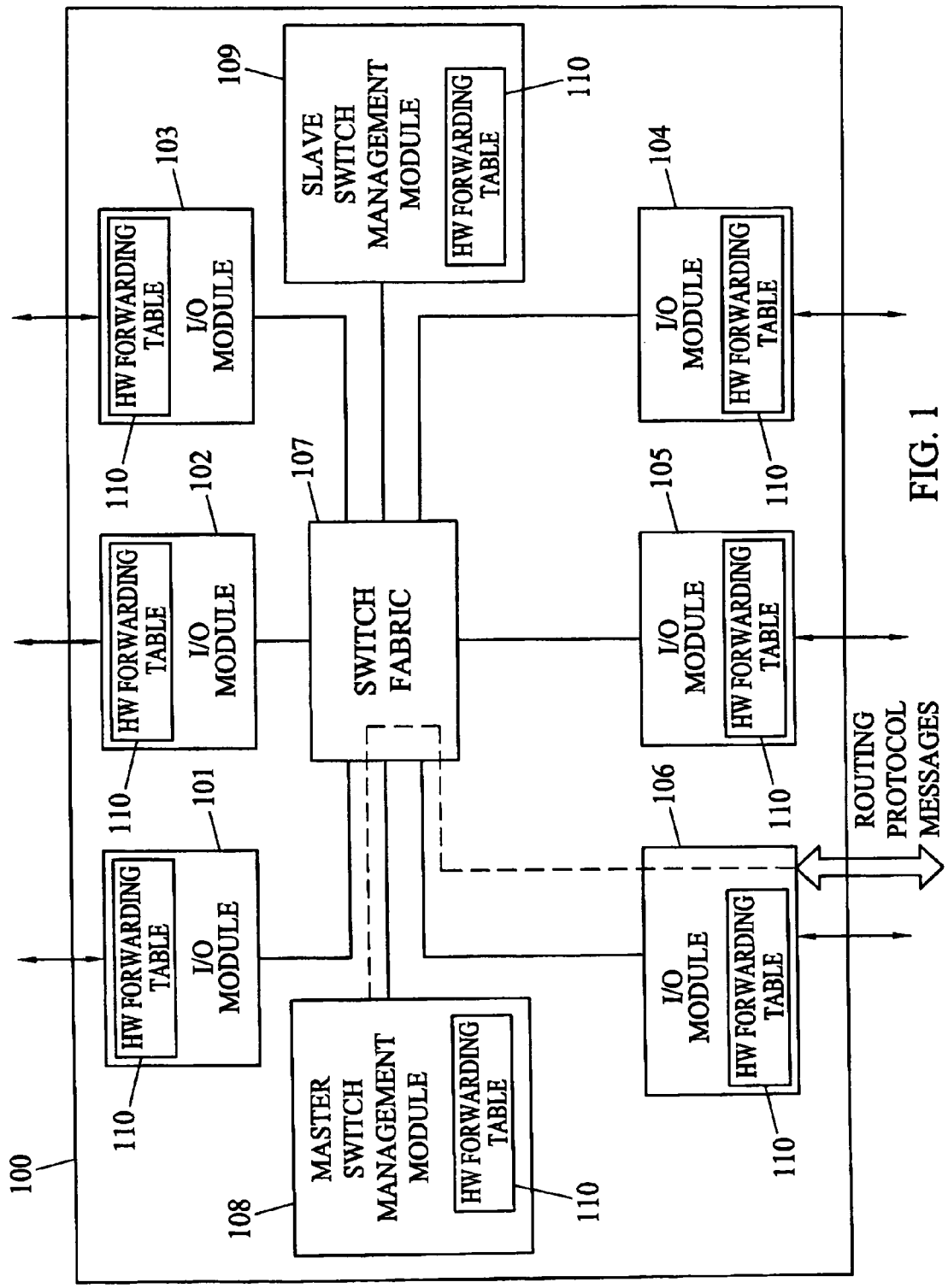
FIG. 1 is a block diagram of a forwarding device including master and slave switch management modules according to an embodiment of the present invention.

The methods and systems for hitless switch management module failover and upgrade may be implemented on any suitable packet forwarding device that includes management modules. FIG. 1 is a block diagram illustrating an exemplary forwarding device in which the methods and systems of the present invention may be implemented.

Referring to FIG. 1, forwarding device 100 includes a plurality of input/output modules 101-106. Input/output modules 101-106 send and receive packets over a network. Input/output modules 101-106 may each be implemented as printed circuit boards plugged into slots in forwarding device 100. A switch fabric 107 connects input/output modules to each other and to master and slave switch management modules 108 and 109. may In FIG. 1, a centralized switch fabric is shown for simplicity. However, in one implementation, each I/O module 106 and management module 108 and 109 may include its own switching fabric connecting it to all of the other modules within forwarding device 100.

Figure 2:
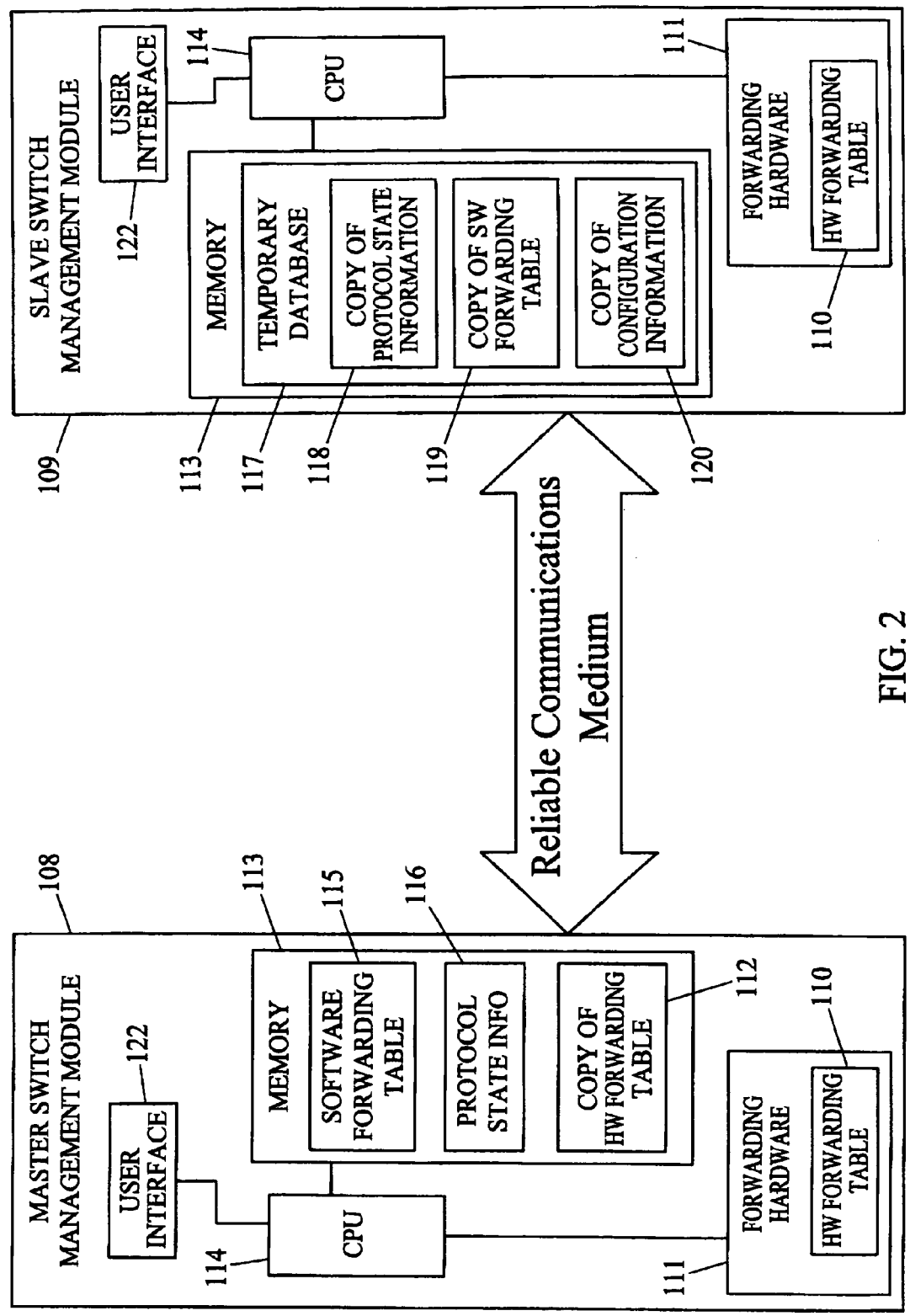
FIG. 2 is a block diagram of master and slave switch management modules including exemplary hardware and software for performing hitless switch management module failover according to an embodiment of the present invention.

Master and slave switch management modules 108 and 109 each include hardware and software for implementing hitless failover and software upgrades. FIG. 2 illustrates exemplary components of master and slave switch management modules 108 and 109 associated with hitless failover and upgrade. In the illustrated example, master and slave switch management modules 108 and 109 each include a hardware forwarding table 110. Hardware forwarding table 110 may be stored in packet forwarding hardware 111. Packet forwarding hardware 111 may be any suitable hardware implementation designed for packet forwarding. For example, packet forwarding hardware 111 may include a set of customized ASICs designed to provide real time processing of transmitted and received data. Such processing may include classifying packets and forwarding the packets to the I/O modules associated with the intended destinations.

Hardware forwarding table 110 stores destination addresses of received packets and corresponding forwarding information. This forwarding table is replicated to input/output modules 101-106 to enable forwarding of packets, as illustrated in FIG. 1. Master and slave switch management modules 108 and 109 also maintain a software copy 112 of hardware forwarding table 110. The software copy maintained by slave switch management module 109 is not shown in FIG. 1 because slave switch management module 109 preferably stores this copy without performing packet forwarding operations until slave switch management module 109 takes over as master. By software copy, it is meant that forwarding table 111 is stored in memory 113 accessible by a CPU 114 of switch management modules 108 and 109.

One reason for maintaining a software copy of hardware forwarding table 110 is to reduce the processing impact of updating entries in hardware forwarding table 110. For example, updating a forwarding table entry typically includes reading the current forwarding table entry, comparing the entry with newly received routing information, and determining whether the forwarding table entry requires updating. This involves multiple reads and writes to hardware as well as intermediate calculations. Performing these operations using only the hardware forwarding table can adversely affect forwarding and management performance. Accordingly, in order to reduce the effects of updating forwarding table entries, software copy 112 may be used. Software copy 112 may be used to determine whether entries in hardware are out of date. The entries in hardware are only accessed when necessary.

The present invention is not limited to storing software copies of hardware forwarding tables. In an alternate embodiment, software copy 112 may be omitted and entries may be updated by accessing hardware forwarding tables 110 directly.

Master and slave switch management modules 108 and 109 may communicate with each other over suitable reliable communications mechanism. In one example, the reliable communication mechanism may be a circular buffer implemented in shared memory. For example, master switch management module 108 may write to a circular buffer and advance the end pointer in the buffer after information is written to the buffer. Slave switch management module 109 may read information from the circular buffer starting at the start pointer to the end pointer and advance the start pointer indicating that the information has been read.

According to an important aspect of the invention, information transfer between the master and slave switch management modules 108 and 109 may be performed via a canonical messaging system. As used herein, the phrase "canonical messaging system" refers to the system used by master and slave switch management modules 108 and 109 that define message types, message lengths, and message values. Using standardized message types, lengths, and values, allows data structures to be communicated between master and slave switch management modules 108 and 109 even when the fields of the data structures change with different software versions. For example, slave switch management module 109 may include a data structure that has an additional field that is not present in the corresponding data structure of master switch management module 108. Master switch management module 108 may send a message to slave switch management module 109 to update the fields in the data structure.

In prior failover implementations where data structures were simply communicated as-is between master and slave switch management modules, the update would fail since the fields in master switch management module data structures do not correspond to the fields and the slave switch management module data structures. However, because the present invention uses a canonical message format, the slave switch management module may decode the corresponding parameters from the message, update the matching fields in its data structures, and leave the fields that are not updated unchanged. In a similar manner, if a switch management module receives an update for a field that it does not recognize, the update may be discarded.

Master switch management module 108 may include a software forwarding table 115 and corresponding protocol state information 116 that is preferably constructed by participating in network protocols. Exemplary network protocols in which master switch management module 108 may participate includes any of the IP routing protocols, such as BGP, OSPF, IS-IS, etc. In addition, switch management module 108 may participate in layer 2 protocols, such as the spanning tree protocol. As will be described in detail below, it is this protocol state information, in addition to the information in software forwarding table 115, this is communicated from master switch management module 108 to slave switch management module 109. Obtaining the most up to date software forwarding table and corresponding protocol state information enables slave switch management module 109 to take over network protocol operations of master switch management module 108 in that state that master switch management module 108 last operated correctly. As a result, the likelihood of a successful hitless failover is increased.

Slave switch management module 109 includes a temporary database 116 that is preferably used to store routing tables, forwarding tables, protocol state information, and configuration information. In the illustrated example, temporary database 117 stores a copy 118 of protocol state information 116, a copy 119 of software forwarding table 115, and a copy 120 of configuration information received from master switch management module 108. Copies 118-120 may be updated periodically by messages received from master switch management module 108. Copies 118-120 stored in temporary database 117 and not used for packet forwarding or switch management while switch management module 109 is operating in the slave mode. However, when switch management module 109 switches to operate in the master mode, copies 118-120 may be accessed by CPU 114 and used to perform master switch management module functions. An exemplary failover routine will be described in detail below.

Hitless failover between switch management modules may be initiated manually by a user or automatically by slave switch management module 109 in response to detecting failure of master switch management module 109. In order to allow manual switch management module failover, master and slave switch modules 108 and 108 may each include a user interface 122. User interface 122 may any suitable type of interface, such as a graphical interface or a command line interface, that allows a user to enter commands to be executed by CPU 114. For example, a user may enter the command "run switch management module failover" via user interface 122 on master switch management module 108 to initiate a failover from master switch management module 108 to slave switch management module 109. Additional commands that may be provided by user interface 122 include commands to control rebooting with different software versions and commands that control whether a switch management module operates in master or slave mode.

Figure 3:
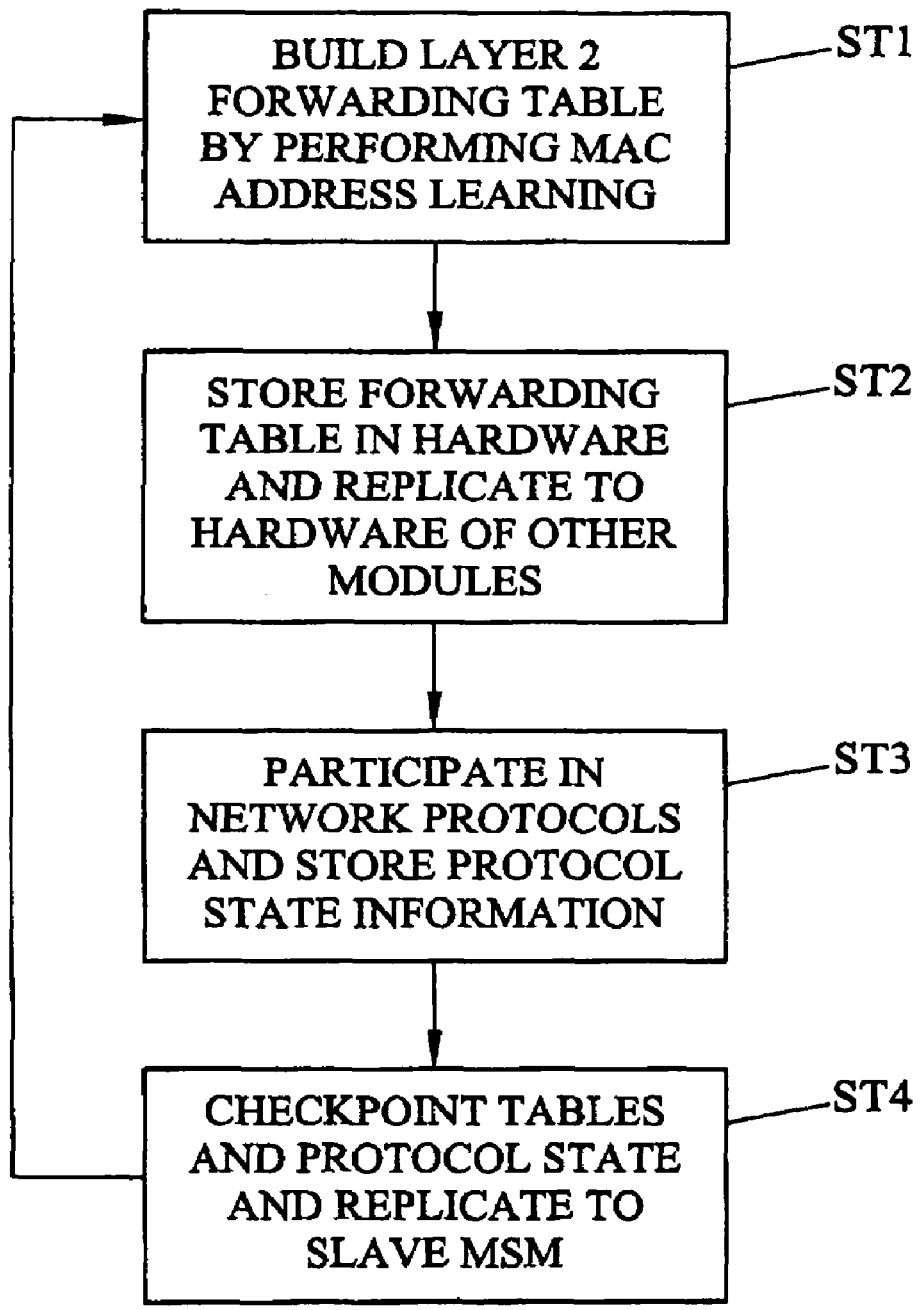
FIG. 3 is a flow chart illustrating exemplary steps that may be performed by a master switch management module in preparation for and during hitless forwarding according to an embodiment of the present invention.
Figure 4:
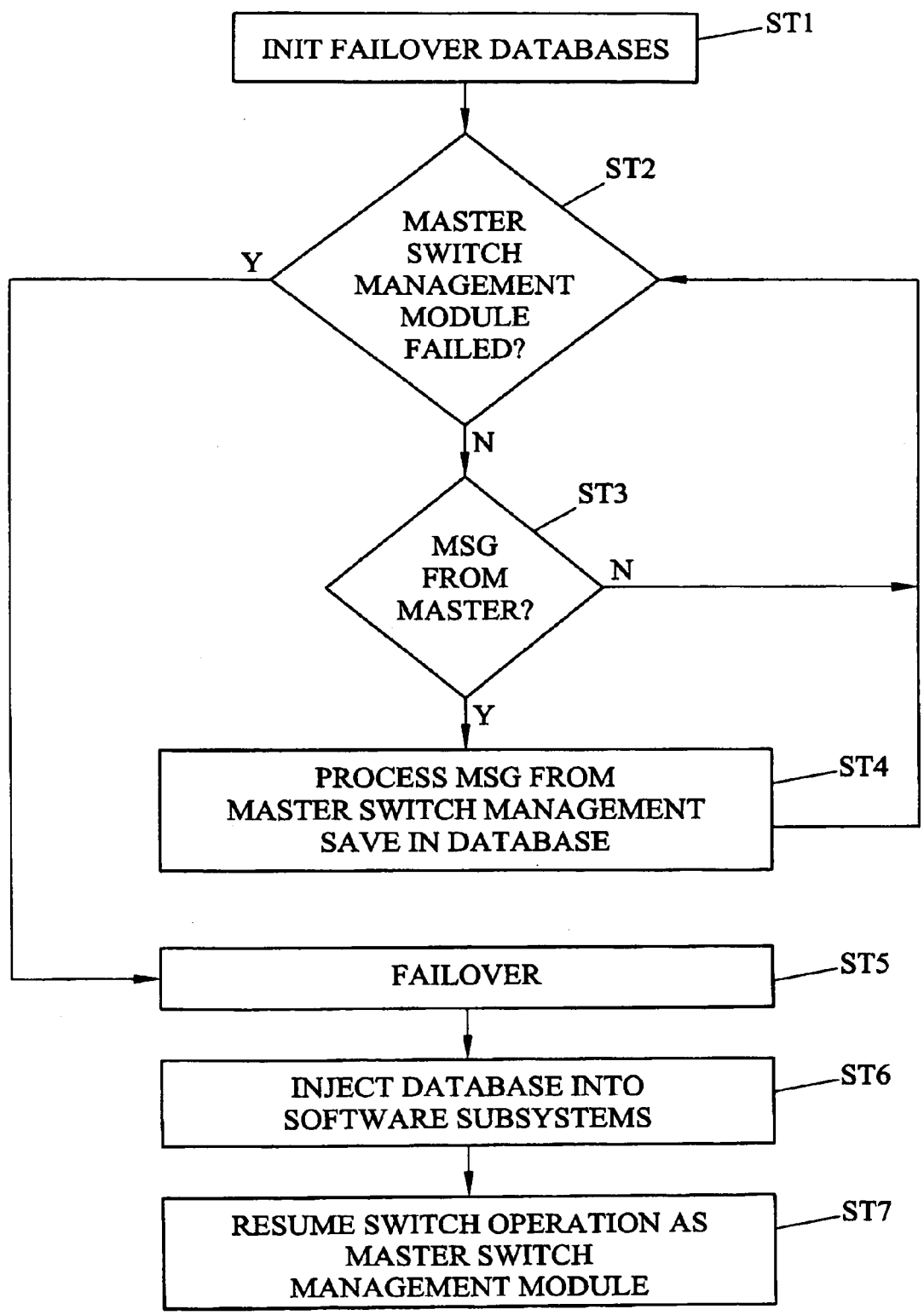
FIG. 4 is a flow chart illustrating exemplary steps that may be performed by slave switch management module in preparation for and during hitless switch management module failover according to an embodiment of the present invention.

FIGS. 3 and 4 are flow charts illustrating exemplary steps that may be performed respectively by master and slave switch management modules 108 and 109 in preparation for and during hitless failover according to an embodiment of the present invention. Referring to FIG. 3, in step ST1, master switch management module 108 builds layer 2 forwarding tables by performing MAC address learning. For example, when a layer 2 frame arrives, master switch management module 108 may determine whether the source MAC address in the frame is known. If the address is not known, the address is stored in the layer 2 forwarding table along with the port on which the packet was received. Thereafter, packets addressed to the newly learned MAC address will be sent to the output port associated with the learned address. Master switch management module 108 may periodically re-write hardware forwarding tables 110 to ensure that the tables are consistent and up to date (ST2).

Hardware forwarding table 110 and software forwarding table 115 may contain MAC/VLAN address combinations and corresponding port numbers. Table 1 shown below illustrates an example of forwarding information that may be included in hardware forwarding table 110 and software forwarding table 115.

TABLE 1

Layer 2 Hardware Forwarding Table Information

| Destination Address/VLAN Tag | Port |
|---|---|
| 01:02:03:04:05:06/100 | 1 |
| 01:02:03:04:05:07/101 | 2 |

Returning to FIG. 3, in step ST3, master switch management module 108 participates in network protocols and stores protocol state information. Participating in network protocols may include participating in layer 2 protocols, such as the spanning tree protocol or the rapid spanning tree protocol and in layer 3 protocols, such as the routing information protocol (RIP), open shortest path first (OSPF) and border gateway protocol (BGP). The corresponding protocol state information may include port states and network topology information. In step ST4, master switch management module 108 checkpoints forwarding database and protocol state information and replicates the information to temporary database 117 stored by the slave switch management module 109. The process of checkpointing involves identifying information in software forwarding database 115 and in protocol state information 116 that has changed and forwarding the changed information to the slave switch management module 109. Thus, the protocol state and packet forwarding information stored by slave switch management module in database 117 may be incrementally updated in synchronism with the corresponding information stored by master switch management module 108. After completing step ST4, control returns to step ST1 and the process repeats.

Slave switch management module 109 preferably does not participate in network protocols, packet forwarding, or switch management until a failover occurs. Rather, slave switch management module 109 executes a non-preemptive, single-threaded routine, an exemplary flow diagram of which is shown in FIG. 4. In step ST1, slave switch management module 109 initializes temporary database 117. In step ST2, slave switch management module 109 determines whether master switch management module 108 has failed. If master switch management module 108 has not failed, then slave switch management module 109 checks for messages from master switch management module 108. If a message from master switch management module 108 is not available, then slave switch management module 109 continues with step ST2. If a message from master switch management module 108 is available, then slave switch management module 109 processes the message and updates temporary database 117, if needed (step ST4). Once the database update has been completed, slave switch management module 109 continues with step ST2. It should be appreciated that steps ST2 though ST4 constitute a steady-state loop that is executed continuously until slave switch management module 109 determines that master switch management module 108 fails.

If in step ST2 the failure of master switch management module 108 is detected, slave switch management module 109 initiates switch management module failover (step ST5). Master switch management module 108 may fail for any number of reasons, including hardware and software exceptions or management action to force activation of slave switch management module 109, e.g., to replace master switch management module 108 or upgrade software executing on master switch management module 108. The failure may be detected by slave switch management module 109 by any number of mechanisms, including the absence of heartbeat messages from master switch management module 108 or a failure message indicating that a failure has occurred.

In step ST6, slave switch management module 109 initializes the software processes and subsystems using the stored database and state information, thereby enabling slave switch management module 109 to begin operating network protocols in the state where master switch management module 108 last operated correctly. One example of protocol state information that enables slave switch management module 109 to start where master switch management module 108 left off is spanning tree state. According to the spanning tree protocol, nodes exchange bridge protocol data units (BPDUs) with each other containing layer 2 address information and distance from a route node. Each node in the spanning tree protocol develops a spanning tree of the layer 2 network topology and sets each of its ports to a blocked state or forwarding state in order to prevent layer 2 forwarding loops.

In some network implementations, the time from startup, exchange of BPDUs, construction of a spanning tree, and setting of the corresponding port states can take up to forty-five seconds. Thus, in an implementation in which slave switch management module 109 did not receive spanning tree protocol state information from master switch management module 108, packets may be dropped while slave switch management module determines its spanning tree port state.

According to the present invention, master switch management module 108 periodically sends spanning tree port state information to slave switch management module 109. Such port states may be sent at predetermined time intervals and whenever master switch management module 108 changes the state of one its ports. When a failover occurs, rather than starting the spanning tree protocol from an initial state, slave switch management module loads the last spanning tree protocol port states received from master switch management module 108. As a result, slave switch management module 109 can begin forwarding packets with the proper spanning tree port states. Thus, by automatically loading protocol state information received from master switch management module 108, the likelihood of hitless failover is increased. In step ST7, slave switch management module 109 resumes switch operation as the master switch management module and may begin executing the steps shown in FIG. 3.

Protocols, such as spanning tree, are time sensitive. This means that they must have their state injected a short time after failover. In one exemplary implementation, the time required to inject the protocol state information into the new master switch management module is 10 s. Configuration of STP timers with values that result in topology changes shorter than 10 s will result in non-hitless failovers. Thus, detection of a failed master that relies on longer timeouts than the STP timers will result in non-hitless failover.

Figure 5:
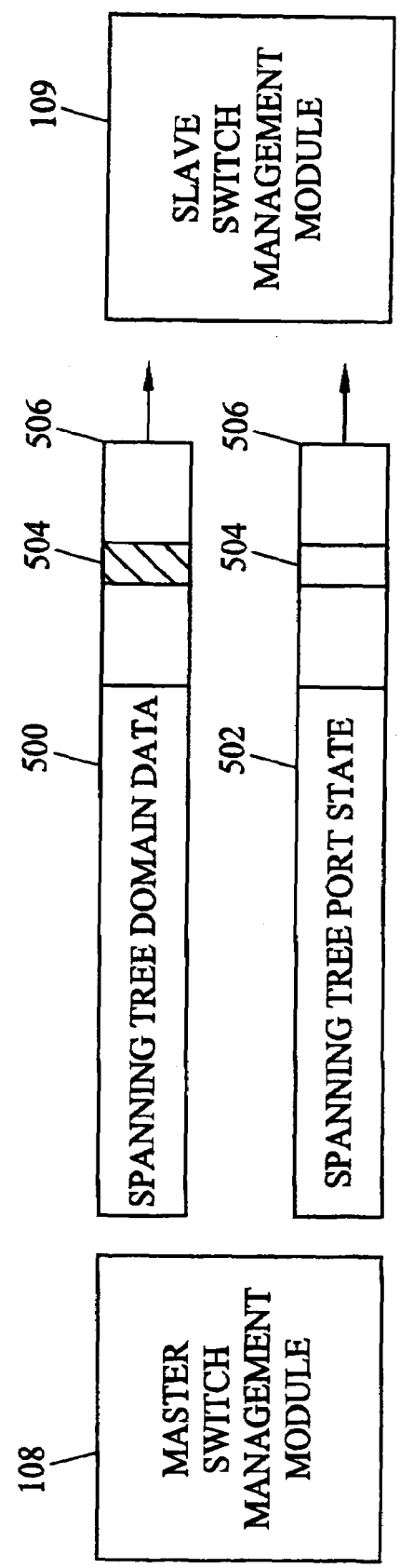
FIG. 5 is a block diagram illustrating exemplary bracketing for messages communicated between master and slave switch management modules according to an embodiment of the present invention.

In order to ensure synchronization between protocol state and forwarding database information transmitted between master switch management module 108 and slave switch management module 109, the present invention may include a bracketing mechanism to allow multiple related messages to be grouped together to form atomic transactions. FIG. 5 illustrates one implementation of bracketing according to an embodiment of the present invention. Referring to FIG. 5, master switch management module 108 may send spanning tree domain data in a first message 500 and corresponding spanning tree port state information in a second message 502 to slave switch management module 109. If master switch management module 108 fails after transmitting message 500 but before transmitting message 502, the spanning tree domain data would be out of sync with the spanning tree port state data at slave switch management module 108.

In order to avoid this difficulty, master switch management module 108 may set a bracket field 504 in a header portion 506 of message 500 to a value that indicates that this message constitutes the beginning of a series of related messages. When slave switch management module 109 receives a message with a begin bracket, slave switch management module 109 enters a received_begin_bracket state in which slave switch management module 109 stores messages received from master switch management module 108 until a message with an end bracket is received. If a message with an end bracket is received, slave switch management module 109 may process all of the messages received since the begin bracket was received. If master switch management module 108 fails, causing message 502 with an end bracket in field 504 not to be received, slave switch management module 109 may discard all messages received since the begin bracket and perform a non-hitless failover to reinitialize its hardware and software with known good data stored in non-volatile memory.

Using bracketing ensures that state information received by slave switch management module 109 will be complete and synchronized with other information received from master switch management module 108, even when such information is communicated in multiple messages. In addition, allowing multiple messages to be grouped as a single atomic transaction ensures that slave switch management module 109 will start in the last complete state of master switch management module 108. Without such a bracketing mechanism, if slave switch management module 109 were permitted to take over as master after receiving incomplete state or forwarding information from master switch management module 108, slave switch management module 109 may also fail.

Hitless Software Upgrade or Downgrade

According to another aspect, the present invention includes methods and systems for hitless software upgrade or downgrade between switch management modules in a switch network element. As described above, performing a software upgrade or downgrade can present problems because both switch management modules must be rebooted. In addition, communication of state information between different software versions has not previously been possible when data structures between software versions change without requiring that the new software version recognize the data structures of all prior software versions. The present invention avoids this difficulty by providing a method for hitless upgrade or downgrade where failover is used to perform a software upgrade and wherein the canonical messages described above are used to communicate protocol state and packet forwarding information to the new software version.

Figure 6:
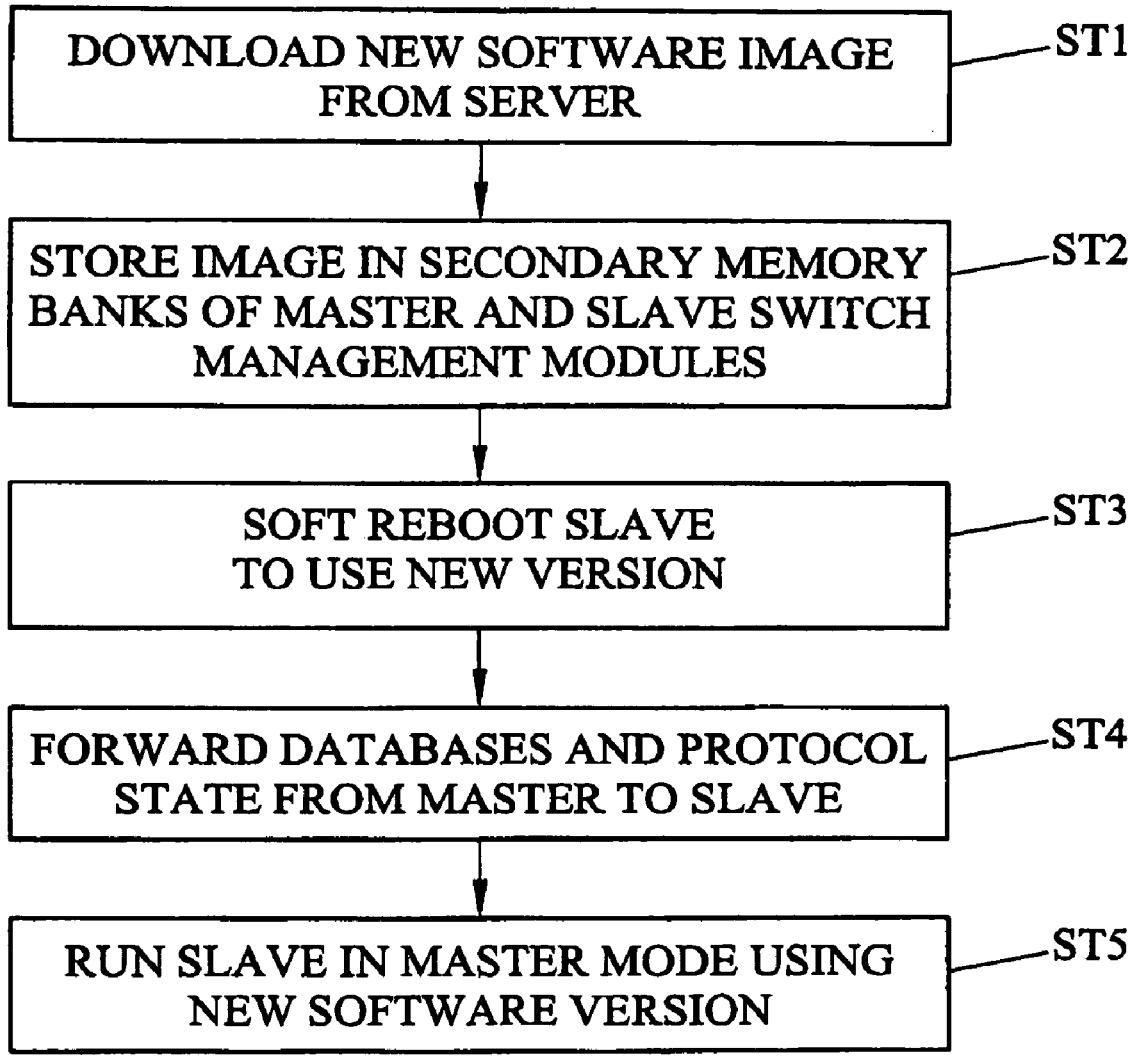
FIG. 6 is a flow chart illustrating exemplary steps for hitless switch management module software upgrade according to an embodiment of the present invention.
Figure 7:
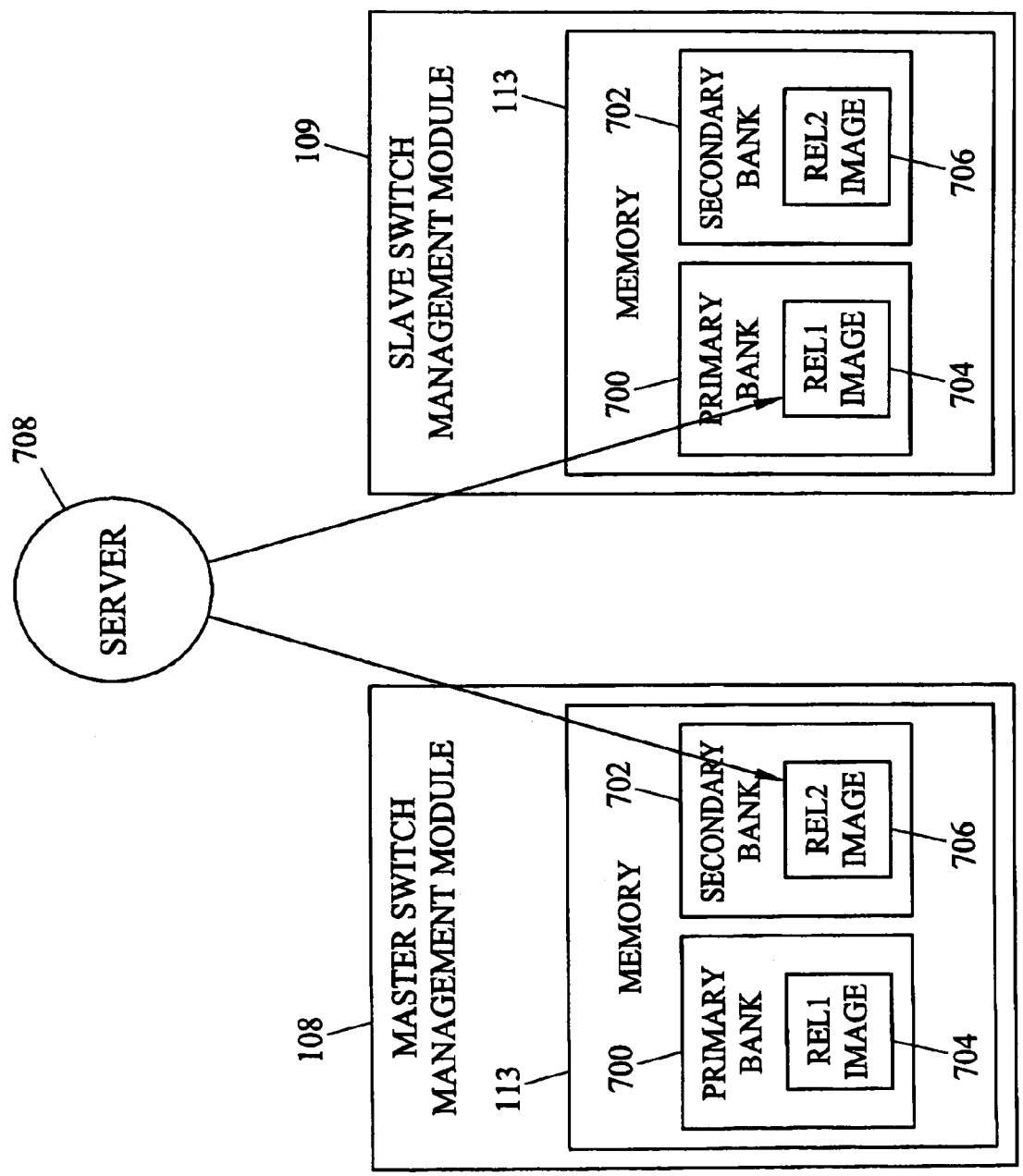
FIG. 7 is a block diagram illustrating exemplary memory banks and data structures associated with hitless switch management module software upgrade according to an embodiment of the present invention.

FIG. 6 is a flow chart and FIG. 7 is a block diagram illustrating exemplary steps for hitless software upgrade or downgrade according to an embodiment of the present invention. Referring to FIG. 6, in step ST1, master and slave switch management modules 108 and 109 download a new software image corresponding to a new version from a server. In step ST2, the master and slave switch management modules 108 and 109 store the new image in their secondary memory banks, i.e., the memory bank that does not contain the image used initially to boot management modules 108 and 109. Referring to FIG. 7, master and slave switch management modules 108 and 109 may include primary memory bank 700 and secondary memory bank 702. Primary and secondary memory banks 700 and 702 may be implemented in non-volatile memory on master and slave switch management modules 108 and 109. In order to perform a soft boot, instructions are copied from either memory banks 700 or 702 and copied into RAM. Each primary memory bank 700 stores an image 704 corresponding to the current version of the software being executed by the switch management module. Each secondary memory bank 702 stores an image 706 corresponding to the new software version downloaded from a server 708.

Returning to FIG. 6, in step ST3, slave switch management module 109 is soft rebooted to use the new software version stored in secondary memory bank 702. This action may be initiated by a user via user interface 122 on slave switch management module 109. For example, the user may enter a command to instruct the slave to reboot using the software image stored in secondary memory bank 702. Once the slave reboots, it preferably operates in slave mode, by performing the steps illustrated above in FIG. 3, but uses the new software version. In step ST4, master switch management module 108 forwards its databases and current protocol state information to slave switch management module 109. Because slave switch management module 109 executes a different software version and may have different data structures, the canonical message format described above may be used.

Figure 8:
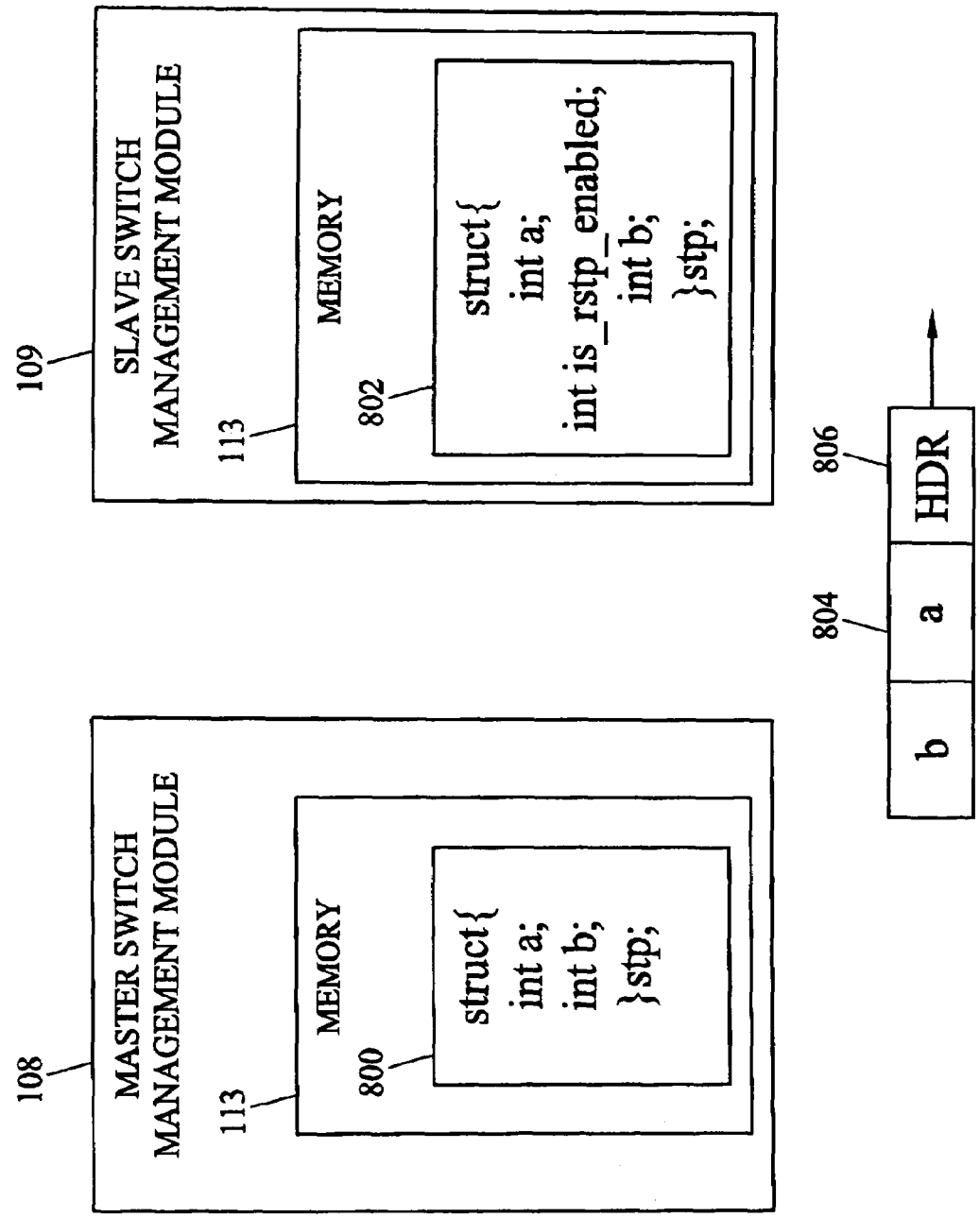
FIG. 8 is a block diagram illustrating exemplary communication between master and slave switch management modules using a canonical message format according to an embodiment of the present invention.

FIG. 8 illustrates an example of how different data structures used by different software versions are communicated from master switch management module 108 to slave switch management module 109. Referring to FIG. 8, master switch management module includes a first data structure 800 of type stp, stored in memory 113. Data structure 800 includes two thirty-two bit integers, a and b. Slave switch management module 109 also has a data structure 802 of type stp. However, the stp data structure used by slave switch management module 109 includes three integers, a, r_stp_enabled, and b. Thus, if data structure 800 were copied directly from master switch management module 108 to slave switch management module 109, an error would result because the value for the integer b stored by master switch management module 108 would be written to the memory location for the integer r_stp_enabled on slave switch management module 109. However, according to the present invention, master switch management module 108 and slave switch management module 109 use a canonical messaging system to reconstruct data structures. The canonical messaging system allows values to be exchanged in any order using a unique message format. In this example, master switch management module 108 sends a message 804 including a header 806 that describes the message type and the length of each parameter. The message type may indicate that message 804 is communicating a data structure to slave switch management module 109. Header 806 may include the type and length of each value stored in each field. In an alternative implementation, a separate header or TLV may be included before each data field.

Upon receiving message 804, slave switch management module 109 decodes the header and extracts the corresponding values for the integers a and b. Slave switch management module uses these values to update integers a and b in its data structure. Since message 804 does not include a value for the r_stp_enabled variable, slave switch management module 109 may set this parameter to a default value. Thus, even though master and slave switch management modules 108 and 109 may execute different software versions that use different data structures, the canonical messaging system of the present invention allows hitless upgrade to be performed.

Returning to FIG. 6, in step ST5, once slave switch management module 109 has received the databases and protocol state information from master switch management module 108, slave switch management module 109 changes to master mode using the new software version. This change may be initiated by a user via user interface 122 on master switch management module 108. For example, the user may enter a command or series of commands forces master to reboot in slave mode and the slave to reboot in master mode using the software image stored in the secondary memory bank. For example, "run switch management module failover" may be entered via user interface 122 to initiate a failover and force each module to reboot with a different software version. Thus, by using a failover routine to trigger a software upgrade or downgrade, changes in software version may be performed hitlessly.

As stated above, since slave switch management module has received current protocol state and database information form master switch management module 108, slave switch management module 109 can resume from the last correct network protocol operational state of master switch management module 108. As a result, a hitless software upgrade may be performed. In addition, using the same steps illustrated in FIG. 6, a software downgrade may be performed.

Thus, the present invention includes methods and systems for hitless switch management module failover and upgrade. By communicating protocol state information and updates in protocol state information from a master switch management module to the slave switch management module, the slave switch management module can resume network protocol operation at the point where the master switch management module last operated correctly. In addition, bracketing is used to send multiple related messages as an atomic unit to insure synchronization between related information. Finally, the failover mechanism can be used to perform a hitless software upgrade between master and slave switch management modules.

Although the methods and systems described above relate primarily to successfully achieving hitless failover, the present invention is not limited to only performing successful hitless failover. Once the slave takes over as master after a failover, the slave may determine that a hitless failover is not prudent. For example, if the reason for failover is that the master was rebooted due to a hardware watchdog mechanism, the slave may indicate that there has been too much time since the last update from the master and inject a failed state into the hitless failover state machine, the operation of which is described above with respect to FIGS. 3 and 4, preventing hitless failover. In this case, failover will still occur but the network will incur a traffic "hit". In this situation, the slave may enter a failed state and communicate this fact to the master. The master may then communicate the failure cause to the user.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for hitless switch management module failover, the method comprising:
   (a) at a first switch management module in a switch, operating in a master mode, wherein operating in the master mode includes:
      (i) performing packet forwarding and participating in network protocols;
      (ii) maintaining packet forwarding and protocol state information based on step (i); and
      (iii) communicating the packet forwarding and protocol state information to a second switch management module operating in a slave mode, wherein the packet forwarding and protocol state information is associated with a state in which the first switch management module last operated correctly; and
   (b) at the second switch management module in the switch, operating in the slave mode, wherein operating in the slave mode includes:
      (i) continuously monitoring the operational state of the first switch management module;
      (ii) receiving the packet forwarding and protocol state information from the first switch management module; and
      (iii) in response to detecting failure of the first switch management module, switching to the master mode and resuming network protocol operation from the state in which the first switch management module last operated correctly by injecting the received packet forwarding and protocol state information into one or more subsystems of the second switch management module associated with performing packet forwarding and participating in network protocols.

2. The method of claim 1 wherein performing packet forwarding includes performing at least one of layer 2 and layer 3 packet forwarding.

3. The method of claim 1 wherein participating in network protocol includes participating in at least one of layer 2 and layer 3 network protocols.

4. The method of claim 3 wherein participating in layer 2 network protocols includes participating in a spanning tree protocol.

5. The method of claim 1 wherein maintaining packet forwarding information includes maintaining layer 2 packet forwarding tables.

6. The method of claim 1 wherein storing protocol state information includes storing layer 2 protocol state information.

7. A method for hitless switch management module failover, the method comprising:
(a) at a first switch management module in a switch, operating in a master mode, wherein operating in the master mode includes:
(j) performing packet forwarding and participating in network protocols;
(ii) maintaining packet forwarding and protocol state information based on step (i) wherein maintaining packet forwarding information includes maintaining layer 2 spanning tree protocol information; and
(iii) communicating the packet forwarding and protocol state information to a second switch management module operating in a slave mode; and
(b) at the second switch management module in the switch, operating in the slave mode, wherein operating in the slave mode includes:
(j) continuously monitoring the operational state of the first switch management module;
(ii) receiving the packet forwarding and protocol state information from the first switch management module; and
(iii) in response to detecting failure of the first switch management module, switching to the master mode and resuming network protocol operation from a state in which the first switch management module last operated correctly by injecting the received packet forwarding and protocol state information into one or more subsystems of the second switch management module associated with performing packet forwarding and participating in network protocols.

8. A method for hitless switch management module failover, the method comprising:
(a) at a first switch management module in a switch, operating in a master mode, wherein operating in the master mode includes:
(k) performing packet forwarding and participating in network protocols;
(ii) maintaining packet forwarding and protocol state information based on step (i); and
(iii) communicating the packet forwarding and protocol state information to a second switch management module operating in a slave mode using a canonical message format, wherein the canonical message format is a message format that corresponds to message type and length rules stored by the master and slave switch management modules; and
(b) at the second switch management module in the switch, operating in the slave mode, wherein operating in the slave mode includes:
(k) continuously monitoring the operational state of the first switch management module;
(ii) receiving the packet forwarding and protocol state information from the first switch management module; and
(iii) in response to detecting failure of the first switch management module, switching to the master mode and resuming network protocol operation from a state in which the first switch management module last operated correctly based on the received packet forwarding and protocol state information.

9. The method of claim 8 wherein using the canonical message format includes sending data structures in messages in which fields are decodable by the second switch management module independently of the order in which the fields are placed in the messages.

10. The method of claim 8 wherein using the canonical message format includes defining messages types, lengths, and values recognizable by the first and second switch management modules and formatting messages sent from the first switch management module to the second switch management module utilizing the types, lengths, and values.

11. The method of claim 10 comprising communicating a first data structure from the first switch management module to the second switch management module utilizing the types, lengths, and values, wherein the second switch management module includes a second data structure that has different fields from the first data structure, and wherein the second switch management modules uses the types, lengths, and values to update fields in the second data structure corresponding to fields in the first data structure.

12. The method of claim 11 wherein the second switch management module sets fields in the second data structure that do not correspond to fields in the first data structure to default values.

13. The method of claim 1 wherein communicating the protocol state information to the second switch management module includes communicating the protocol state information in response to changes in the protocol state information.

14. A method for hitless switch management module failover, the method comprising:
(a) at a first switch management module in a switch, operating in a master mode, wherein operating in the master mode includes:
(i) performing packet forwarding and participating in network protocols;
(ii) maintaining packet forwarding and protocol state information based on step (i); and
(iii) communicating the packet forwarding and protocol state information to a second switch management module operating in a slave mode using bracketing to group related messages together, wherein using bracketing to group related messages together includes grouping all messages received between an open bracket and a closed bracket as part of a single transaction; and
(b) at the second switch management module in the switch, operating in the slave mode, wherein operating in the slave mode includes:
(i) continuously monitoring the operational state of the first switch management module;
(ii) receiving the packet forwarding and protocol state information from the first switch management module; and (iii) in response to detecting failure of the first switch management module, switching to the master mode and resuming network protocol operation from a state in which the first switch management module last operated correctly based on the received packet forwarding and protocol state information.

15. The method of claim 14 wherein using bracketing includes, at the second switch management module, in response to receiving an open bracket, and storing messages received after the open bracket.

16. The method of claim 15 comprising, at the second switch management module, in response to detecting failure of the first switch management module and failing to receive a close bracket, discarding messages received since the open bracket.

17. The method of claim 15 comprising, in response to receiving a close bracket, processing messages received since the open bracket and updating corresponding protocol state and packet forwarding information.

18. A method for hitless switch management module failover, the method comprising:
(a) at a first switch management module in a switch, operating in a master mode, wherein operating in the master mode includes:
   (j) performing packet forwarding and participating in network protocols;
   (ii) maintaining packet forwarding and protocol state information based on step (i); and
   (iii) communicating the packet forwarding and protocol state information to a second switch management module operating in a slave mode using bracketing to group related messages together, wherein using bracketing to group related messages together includes grouping all messages received between an open bracket and a closed bracket as part of a single transaction; and
(b) at the second switch management module in the switch, operating in the slave mode, wherein operating in the slave mode includes:
   (i) continuously monitoring the operational state of the first switch management module;
   (ii) receiving the packet forwarding and protocol state information from the first switch management module;
   (iii) in response to detecting failure of the first switch management module, switching to the master mode and resuming network protocol operation from a state in which the first switch management module last operated correctly based on the received packet forwarding and protocol state information; and
   (iv) after switching to the master mode, detecting non-hitless operation and a cause for the non-hitless operation, and communicating the cause to the first switch management module.

19. A method for hitless software upgrade or downgrade in a switched network element, the method comprising:
(a) operating a first switch management module in the switched network element in a master mode, wherein operating in the master mode includes forwarding packets and participating in network protocols using a first software version;
(b) operating a second switch management module in a slave mode, wherein operating in the slave mode includes monitoring the operational state of the first switch management module using the first software version;
(c) storing a second software version in memory;
(d) rebooting the second switch management module using the second software version;
(e) distributing protocol state and packet forwarding information from the first switch management module executing the first software version to the second switch management module executing the second software version; and
(f) at the second switch management module, switching from operating in the slave mode to the master mode, wherein operating in the master mode includes injecting the protocol state and packet forwarding information received from the first switch management module into one or more subsystems of the second switch management module associated with performing packet forwarding and participating in network protocols and starting packet forwarding and network protocol operations using the protocol state and packet forwarding information received from the first switch management module, thereby starting from the last correct network protocol operational state of the first switch management module.

20. The method of claim 19 where operating the first switch management module in the master mode includes performing layer 2 packet forwarding operations.

21. The method of claim 19 wherein participating in network protocols using a first software version includes participating in layer 2 network protocols.

22. The method of claim 21 wherein participating in layer 2 network protocols includes participating in a spanning tree protocol.

23. The method of claim 19 wherein operating the second switch management module in the slave mode includes storing the packet forwarding and protocol state information received from the first switch management module.

24. A method for hitless software upgrade or downgrade in a switched network element, the method comprising:
(a) operating a first switch management module in the switched network element in a master mode, wherein operating in the master mode includes forwarding packets and participating in network protocols using a first software version;
(b) operating a second switch management module in a slave mode, wherein operating in the slave mode includes monitoring the operational state of the first switch management module using the first software version and storing the packet forwarding and protocol state information received from the first switch management module and operating the second switch management module without performing packet forwarding or participating in network protocols;
(c) storing a second software version in memory;
(d) rebooting the second switch management module using the second software version;
(e) distributing protocol state and packet forwarding information from the first switch management module executing the first software version to the second switch management module executing the second software version; and
(f) at the second switch management module, switching from operating in the slave mode to the master mode, wherein operating in the master mode includes injecting the protocol state and packet forwarding information received from the first switch management module into one or more subsystems of the second switch management module associated with performing packet forwarding and participating in network protocols and starting packet forwarding and network protocol operations using the protocol state and packet forwarding information received from the first switch management module, thereby starting from the last correct network protocol operational state of the first switch management module.

25. A method for hitless software upgrade or downgrade in a switched network element, the method comprising:
   (a) operating a first switch management module in the switched network element in a master mode, wherein operating in the master mode includes forwarding packets and participating in network protocols using a first software version;
   (b) operating a second switch management module in a slave mode, wherein operating in the slave mode includes monitoring the operational state of the first switch management module using the first software version;
   (c) storing a second software version in memory, wherein storing the second software version in memory associated with the second switch management module includes obtaining the second software version from a server and storing the second software version in memory associated with the second switch management module;
   (d) rebooting the second switch management module using the second software version;
   (f) distributing protocol state and packet forwarding information from the first switch management module executing the first software version to the second switch management module executing the second software version; and
   (g) at the second switch management module, switching from operating in the slave mode to the master mode, wherein operating in the master mode includes injecting the protocol state and packet forwarding information received from the first switch management module into one or more subsystems of the second switch management module associated with performing packet forwarding and participating in network protocols and starting packet forwarding and network protocol operations using the protocol state and packet forwarding information received from the first switch management module, thereby starting from the last correct network protocol operational state of the first switch management module.

26. A method for hitless software upgrade or downgrade in a switched network element, the method comprising:
   (a) operating a first switch management module in the switched network element in a master mode, wherein operating in the master mode includes forwarding packets and participating in network protocols using a first software version;
   (b) operating a second switch management module in a slave mode, wherein operating in the slave mode includes monitoring the operational state of the first switch management module using the first software version;
   (c) storing a second software version in memory;
   (d) rebooting the second switch management module using the second software version wherein rebooting the second switch management module includes performing a soft reboot of the second switch management module wherein software is reset, but hardware is not;
   (e) distributing protocol state and packet forwarding information from the first switch management module executing the first software version to the second switch management module executing the second software version; and
   (f) at the second switch management module, switching from operating in the slave mode to the master mode, wherein operating in the master mode includes injecting the protocol state and packet forwarding information received from the first switch management module into one or more subsystems of the second switch management module associated with performing packet forwarding and participating in network protocols and starting packet forwarding and network protocol operations using the protocol state and packet forwarding information received from the first switch management module, thereby starting from the last correct network protocol operational state of the first switch management module.

27. A method for hitless software upgrade or downgrade in a switched network element, the method comprising:
   (a) operating a first switch management module in the switched network element in a master mode, wherein operating in the master mode includes forwarding packets and participating in network protocols using a first software version;
   (b) operating a second switch management module in a slave mode, wherein operating in the slave mode includes monitoring the operational state of the first switch management module using the first software version;
   (c) storing a second software version in memory;
   (d) rebooting the second switch management module using the second software version;
   (e) distributing protocol state and packet forwarding information from the first switch management module executing the first software version to the second switch management module executing the second software version using canonical messages, wherein the canonical message format is a message format that corresponds to message type and length rules stored by the master and slave switch management modules; and
   (f) at the second switch management module, switching from operating in the slave mode to the master mode, wherein operating in the master mode includes starting packet forwarding and network protocol operations using the protocol state and packet forwarding information received from the first switch management module, thereby starting from the last correct network protocol operational state of the first switch management module.

28. The method of claim 27 comprising, at the second switch management module, updating fields in data structures that correspond to fields in data structures at the first switch management module based on the canonical messages.

29. The method of claim 28 comprising, at the second switch management module, setting fields in the data structures that do not correspond to fields in data structures at the first switch management module to default values.

30. A method for hitless software upgrade or downgrade in a switched network element, the method comprising:
   (a) operating a first switch management module in the switched network element in a master mode, wherein operating in the master mode includes forwarding packets and participating in network protocols using a first software version;
   (b) operating a second switch management module in a slave mode, wherein operating in the slave mode includes monitoring the operational state of the first switch management module using the first software version;

(c) storing a second software version in memory;

(d) rebooting the second switch management module using the second software version;

(e) distributing protocol state and packet forwarding information from the first switch management module executing the first software version to the second switch management module executing the second software version using bracketing to group related message from the first switch management module to the second switch management module together in a single atomic transaction, wherein using bracketing to group related messages together includes grouping all messages received between an open bracket and a closed bracket as part of a single transaction; and (f) at the second switch management module, switching from operating in the slave mode to the master mode, wherein operating in the master mode includes starting packet forwarding and network protocol operations using the protocol state and packet forwarding information received from the first switch management module, thereby starting from the last correct network protocol operational state of the first switch management module.

31. The method of claim 30 wherein using bracketing comprises, at the second switch management module, grouping messages received between a start bracket and an end bracket together and using the messages to update protocol state information and discarding messages received after a start bracket in response to failing to receive an end bracket.

32. A method for hitless software upgrade or downgrade in a switched network element, the method comprising:

(a) operating a first switch management module in the switched network element in a master mode, wherein operating in the master mode includes forwarding packets and participating in network protocols using a first software version;

(b) operating a second switch management module in a slave mode, wherein operating in the slave mode includes monitoring the operational state of the first switch management module using the first software version;

(c) storing a second software version in memory wherein the first software version is newer than the second software version;

(d) rebooting the second switch management module using the second software version;

(e) distributing protocol state and packet forwarding information from the first switch management module executing the first software version to the second switch management module executing the second software version; and (f) at the second switch management module, switching from operating in the slave mode to the master mode, wherein operating in the master mode includes injecting the protocol state and packet forwarding information received from the first switch management module into one or more subsystems of the second switch management module associated with performing packet forwarding and participating in network protocols and starting packet forwarding and network protocol operations using the protocol state and packet forwarding information received from the first switch management module, thereby starting from the last correct network protocol operational state of the first switch management module.

33. A method for hitless software upgrade or downgrade in a switched network element, the method comprising:

(a) operating a first switch management module in the switched network element in a master mode, wherein operating in the master mode includes forwarding packets and participating in network protocols using a first software version;

(b) operating a second switch management module in a slave mode, wherein operating in the slave mode includes monitoring the operational state of the first switch management module using the first software version;

(c) storing a second software version in memory wherein the first software version is older than the second software version;

(d) rebooting the second switch management module using the second software version;

(e) distributing protocol state and packet forwarding information from the first switch management module executing the first software version to the second switch management module executing the second software version; and (f) at the second switch management module, switching from operating in the slave mode to the master mode, wherein operating in the master mode includes injecting the protocol state and packet forwarding information received from the first switch management module into one or more subsystems of the second switch management module associated with performing packet forwarding and participating in network protocols and starting packet forwarding and network protocol operations using the protocol state and packet forwarding information received from the first switch management module, thereby starting from the last correct network protocol operational state of the first switch management module.

34. A system for hitless switch management module failover, the system comprising:

(a) a first switch management module for initially operating in a master mode, for managing the programming of hardware forwarding tables in a switched network element, for participating in network protocols, and for distributing protocol state, switch configuration, and packet forwarding information to a second switch management module; and (b) a second switch management module for operating in a slave mode, for storing the packet forwarding, switch configuration, and protocol state information received from the first switch management module, for monitoring the operational state of the first switch management module, and for, in response to failure of the first switch management module, switching to operate in the master mode in a last correct network protocol operational state of the first switch management module by injecting the received packet forwarding and protocol state information into one or more subsystems of the second switch management module associated with performing packet forwarding and participating in network protocols.

35. The system of claim 34 wherein the first switch management module is adapted to store layer 2 protocol state information and to periodically distribute the layer 2 protocol state information to the second switch management module.

36. The system of claim 35 wherein the layer 2 protocol state information includes spanning tree protocol state information.

37. A system for hitless switch management module failover, the system comprising:

(a) a first switch management module for initially operating in a master mode, for managing the programming of hardware forwarding tables in a switched network element, for participating in network protocols, and for distributing protocol state, switch configuration, and packet forwarding information to a second switch management module wherein the first switch management module is adapted to communicate the protocol state and packet forwarding information to the slave switch management module using canonical messages, wherein the canonical message format is a message format that corresponds to message type and length rules stored by the master and slave switch management modules; and (b) a second switch management module for operating in a slave mode, for storing the packet forwarding, switch configuration, and protocol state information received from the first switch management module, for monitoring the operational state of the first switch management module, and for, in response to failure of the first switch management module, switching to operate in the master mode in a last correct network protocol operational state of the first switch management module based on the received protocol state and packet forwarding information.

38. The system of claim 37 wherein first and second switch management modules includes at least one corresponding data structure with different fields, wherein the second switch management module is adapted to use data received via a canonical message to update fields in its data structure that correspond to fields in the data structure maintained by the first switch management module.

39. The system of claim 38 wherein the second switch management module is adapted to set fields in its data structure that do not correspond to fields in the data structure maintained by the first switch management module to default values.

40. A system for hitless switch management module failover, the system comprising:

(a) a first switch management module for initially operating in a master mode, for managing the programming of hardware forwarding tables in a switched network element, for participating in network protocols, and for distributing protocol state, switch configuration, and packet forwarding information to a second switch management module wherein the first switch management module is adapted to use a bracketing mechanism to transfer related messages as atomic units to the second switch management module, wherein the bracketing mechanism is configured to group all messages received between an open bracket and a closed bracket as part of a single transaction; and (b) a second switch management module for operating in a slave mode, for storing the packet forwarding, switch configuration, and protocol state information received from the first switch management module, for monitoring the operational state of the first switch management module, and for, in response to failure of the first switch management module, switching to operate in the master mode in a last correct network protocol operational state of the first switch management module based on the received protocol state and packet forwarding information.

41. The system of claim 40 wherein the first switch management module is adapted to send an open bracket indicator to the second switch management module to initiate transfer of message containing related information.

42. The system of claim 41 wherein the second switch management module is adapted to discard messages received after the open bracket indicator if a close bracket indicator is not received.

43. The system of 42 wherein the second switch management module is adapted to process messages received after the open bracket indicator and to update the corresponding protocol state information in response to receiving the close bracket indicator within the predetermined time period.

44. A system for hitless switch management module failover, the system comprising:

(a) a first switch management module for initially operating in a master mode, for managing the programming of hardware forwarding tables in a switched network element, for participating in network protocols, and for distributing protocol state, switch configuration, and packet forwarding information to a second switch management module;

(b) a second switch management module for operating in a slave mode, for storing the packet forwarding, switch configuration, and protocol state information received from the first switch management module, for monitoring the operational state of the first switch management module, and for, in response to failure of the first switch management module, switching to operate in the master mode in a last correct network protocol operational state of the first switch management module by injecting the received protocol state and packet forwarding information into one or more subsystems of the second switch management module associated with performing packet forwarding and participating in network protocols; and (c) a user interface operatively associated with at least one of the first and second switch management modules for allowing a user to manually initiate a failover from the first switch management module to the second switch management module.

* * * * *